United States Patent [19]

Agricola

[11] 3,996,424
[45] Dec. 7, 1976

[54] ELECTRONIC TELEPHONE SYSTEMS

[75] Inventor: Manfred Agricola, Bad Vilbel, Germany

[73] Assignee: Telefonbau und Normalzeid G.m.b.H., Frankfurt am Main, Germany

[22] Filed: Aug. 23, 1974

[21] Appl. No.: 499,895

[30] Foreign Application Priority Data

Aug. 29, 1973 Germany .......................... 2343498

[52] U.S. Cl. .................................. 179/18 J; 179/99
[51] Int. Cl.² .......................................... H04J 3/12
[58] Field of Search ............... 179/15 BA, 18 J, 99, 179/27 D, 27 DB, 18 AD, 15 AL

[56] References Cited

UNITED STATES PATENTS

| 3,643,030 | 2/1972 | Sparrendahl | 179/15 BA |
| 3,701,854 | 10/1972 | Anderson | 179/18 AD |
| 3,749,848 | 7/1973 | Knollman | 179/99 |
| 3,757,050 | 9/1973 | Mizote | 179/15 AL |
| 3,843,845 | 10/1974 | Ridley | 179/99 |

Primary Examiner—David L. Stewart
Attorney, Agent, or Firm—Erwin Salzer

[57] ABSTRACT

A station direct station selection system is provided with a time division multiplex signalling line which carries all the signals that are required to establish and to terminate connections. The control means for establishing and terminating connections are decentralized and arranged mainly at the locations of the subscriber stations and at the locations of the line transmissions.

3 Claims, 4 Drawing Figures

ELECTRONIC TELEPHONE SYSTEMS

BACKGROUND OF THE INVENTION

This invention relates to telephone systems wherein connections between subscriber stations, or between subscriber stations and lines extending beyond such stations, e.g. office lines, are established by operating a line key which is connected with the called subcirber station or office line, and in which systems the control means for establishing connections are decentralized and arranged mainly at the subscriber stations and at the line transmissions, respectively.

There are two principal kinds of branch systems, i.e. "systems with exchanges" and "series systems." In a "series system" an external office call passes all the series stations connected in parallel to a voice line, and ends in a main series station which is provided with a buzzer. The series branch stations are provided with keys for establishing connections with office subscriber stations. Other series stations than the aforementioned main series station may recieve office calls. Each entitled branch station may likewise receive the call as long as a calling signal is transmitted to the branch stations as, for instance, by means of an additional buzzer. Internal calls among the branch stations are also conducted over the common voice line, each branch station being connected with the others by so-called call lines. The system requires a large number of call lines because all signalling operations are performed by the individual branch stations. Such systems are expensive and complex since they require multi-wire cables. In a modification of the above system the call lines are also used as voice lines, each station of the system being connected to the others by such a line. Hence, in such a system several calls may be conducted simultaneously. Each station may add itself to an established connection so that condference calls may be had.

There are many prior art versions of systems under consideration. In these systems voice information as well as control information is transmitted in conventional, i.e. analog form. As a result, these prior art systems require complex multi-wire cables.

A telephone system which is not subject to all the limitations of the aforementioned prior art systems is disclosed in the paper by Aaronson and Acameora, "A Frequency-Division Multiplex Key Telephone System," IEEE Transactions on Communications Technology, Dec. 1971, pages 1242–1243. The main series station of this system is provided with a space multiplex switching network adapted to connect the voice circuit of each station with each external line and with each internal line. The main series station receives information (receive, hold, connect) from a subscriber station and performs the required control and acoustical and optical signalling functions. A second pair of wires is used for transmitting these control signals between the main series station and all subscriber stations. The independent control of the various functions required at the main series station is effected by a frequency multiplex representation of the various signals. The pair of voice wires is also used to transmit the control signals emanating from a subscriber station to the main series station upon depression of a key at the former.

The principal object of the present invention is to provide small branch telephone systems which combine the advantages of branch systems with exchanges and of series systems or, in other words, to provide a small branch telephone system which does not require complex wiring, nor complex centrally located control means.

SUMMARY OF THE INVENTION

Telephone systems embodying this invention include a common signalling line for all the subscriber stations and for all the line transmissions thereof, said signalling line carrying in interleaved time division multiplex digital form all the information required to establish and to terminate connections, each of said subscriber stations and each of said line transmissions being fixedly assigned a particular time phase within a periodically repeating time frame for the transmission of address information and condition information.

The principal advantage of such systems resides in the elimination of a central station, and consequently the elimination of signalling lines between subscriber and a central station. While prior art series systems required multiple wiring between stations to perform the required operations, or required a central station connected to the signalling inputs of the branch stations, the system embodying this invention is predicated upon signal generation and signal utilization at each of the branch stations. The basic system lends itself also to video and data transmission, in addition to normal internal calls, call transfers, overhearing, conference calls, etc.

DESCRIPTION OF PREFERRED EMBODIMENT

Figure 1:
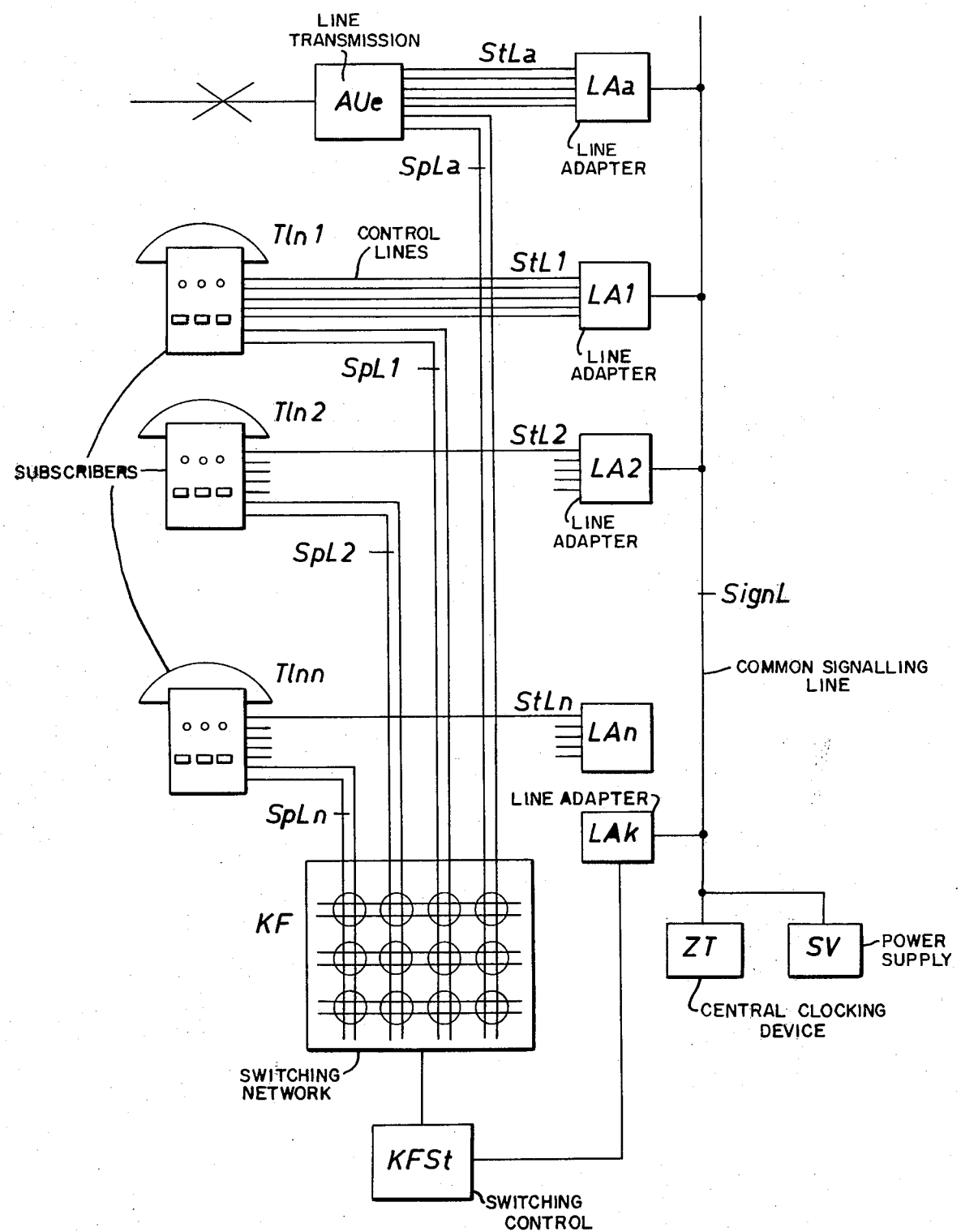
FIG. 1 is a block diagram of a system embodying the present invention.

FIG. 1 shows three subscriber stations $T1n1, T1n2 \ldots T1nn$ and an office transmission circuit AUe intended to represent a larger number of subscriber stations and of transmissions. The subscriber stations and the office transmission are provided with voice lines $SPL1, SPL2 \ldots SpLn, SpLa$ which are connected to the switching network KF. Switching network KF is controlled by switching control KFSt. The subscriber stations $T1N1, T1N2 \ldots T1nn$ and the line transmission AUe are connected in addition to the above referred-to voice lines to control lines $StL1, StL2 \ldots StLn$ and StLa respectively which, in turn, are connected by the intermediary of line adapter means $LA1 \ldots$ common signalling line SignL. The power supply SV and the central clocking device ZT are likewise connected to signalling line SignL. Switching control KFSt receives only signals needed for controlling the switching network KF. A line connects switching control KFSt by the intermediary of a line adapter LAK with the signalling line SignL. The line adapters $LA1 \ldots LAn$ and LAK are means for separating sycnchronizing signals, control signal, timing signals and transmission and reception signals emanating from signalling line SignL from each other. As a rule each of the subscriber stations $T1N1 \ldots T1nn$ shown in FIG. 1 is provided with a number of keys equal to the number of subscriber stations and office lines of the system. In some instances additional keys may be present such as number keys, hold keys and disconnect keys. All keys, except the line hold keys, correspond to keys found in conventional series systems. The line hold keys make it possible to place an office line in a waiting position while an office call is being made, and to interrogate an arriving internal call.

Assuming that it is intended to establish a connection from subscriber station T1n1 to subscriber station T1n2. If subscriber station T1n1 goes off hook, the station is energized. Thereupon the key may be depressed that corresponds to the subscriber station T1n2. As a result, a specific signal in the form of a specific data word including several bits is transmitted to the signalling line SignL, and consequently to all subscriber stations, including the subscriber stations T1n2. The aforementioned specific signal in the form of a specific data word includes the address of station T1n2, and a command signal for energizing a buzzer at station T1n2. The aforementioned specific signal in the form of a specific data word is repeated cyclically as long as the key corresponding to station T1n2 is held depressed at station T1n1. The elements of the data word are, therefore, as follows

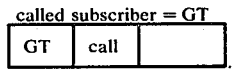

Upon release of the key at the calling station, the latter emits a new signal which consists of the address T1n2$^{(GT)}$ of the called station and information in regard to the state of the call Gespr., i.e. condition of information. This data word has the following appearance

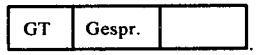

After the called station T1n2 goes off the hook, an additional signal Gespr. is added regarding the state of the call, i.e. condition information. The aggregate signal, therefore, includes the address GT of the called station T1n2, a first state of the call signal, and second state of the call signal.

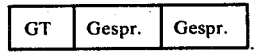

This complete or aggregate signal is transmitted during a time slot or pulse phase, respectively, assigned to subscriber station T1n1.

The data word which includes three distinct pieces of information is evaluated by the switching network control system KFSt. The address of the calling subscriber station T1n1 which corresponds to a given time slot, determines finding of a given column in switching network KF, and the address of the called subscriber station T1n2 determines finding of a given line in switching network KF. The latter is, however, only activated if the signal includes twice information regarding the state of the call.

The switching network KF remains set-up at least for the duration of one, generally, however, for the duration of 4–5 pulse frames. If the complete signal has not appeared after 4–5 pulse frames, e.g. because one of both pieces of information relating to the state of the call are missing, the switching network KF returns to its initial state.

It will be apparent from the foregoing that the control information is transmitted in interleaved fashion by the time division multiplex method, one time phase being set aside or reserved for the subscriber stations and for the line transmissions.

The transmitter of each subscriber station is connected to the transmission path at the beginning of each time phase. During that particular time phase an answer may also be returned from the receiving control of a station. A complete pulse frame includes a sequence of identical data words. Each of these words comprises information regarding the calling station, information relating to the status of the call and reply or answer information emanating from the called station and each of these words includes a plurality of bits. There is a synchronizing pause at the end of each sequence of n words. Thus a sequence of or data words signals may be represented diagrammatically as follows

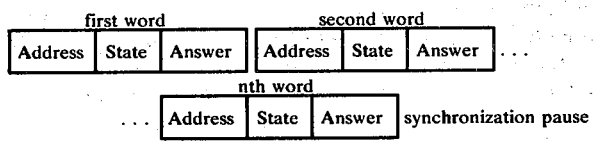

The object of the power supply SV and of the centrally located clock or time piece ZT resides in supplying energy to the diverse subscriber stations in the same rhythm.

Figure 2:
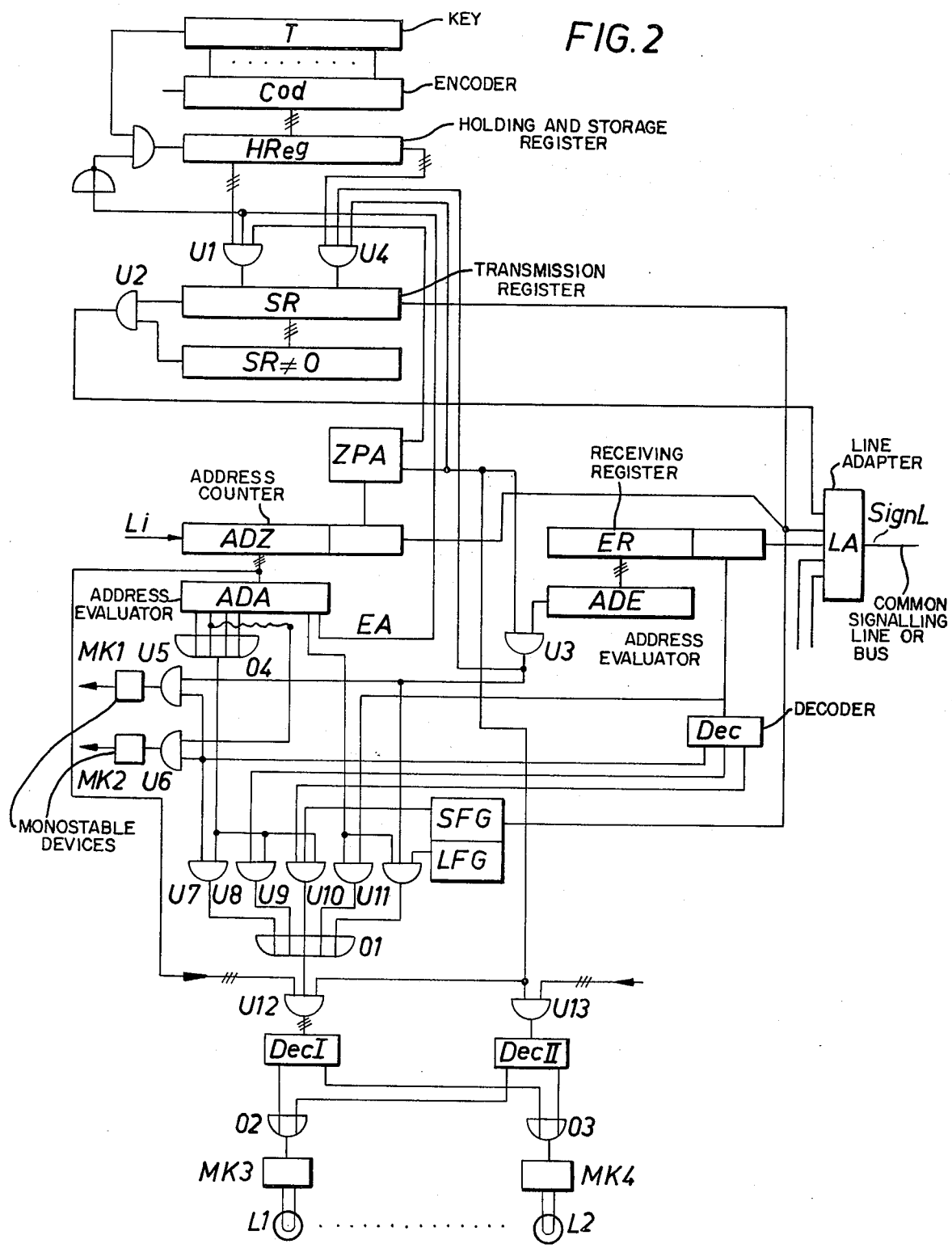
FIG. 2 is a diagram of the control means which are arranged at a subscriber station.

Referring now to FIG. 2, showing one of the above subscriber stations, its structure and mode of operation considered above in general terms will now be considered in more detail. To this end it will be assumed again that one subscriber station T1n1 is calling another subscriber station, e.g. the subscriber station T1n2. The key T is the key intended to call subscriber station T1n2. If key T is depressed, the address of station T1n2 is transmitted by way of an encoder Cod together with the information talk "Gespr" to a holding or storage register HReg. If the key T is further depressed - assuming it has two depressed positions - then a signal "call" is stored in register HReg. Reference numeral ADZ has been applied to indicate an address counter. The central clock or time piece ZT (shown in FIG. 1) transmits pulses to adapter LA from where they reach the aforementioned address counter ADZ where these pulses are counted. One end, i.e. the front end of address counter ADZ, indicates the number of the just prevailing time slot, while the other end of address counter ADZ, i.e. its rear end, indicates the number of the bits inside of the time slot. Address counter ADZ may be reset at zero by means of reset pulses Li and may be synchronized by a start-stop process.

Reference character ADA has been applied to indicate an address evaluater. The latter compares the indications on address counter ADZ with the address of the subscriber station T1n1. When address evaluater or address comparator ADA finds that the address counter ADZ contains the address of the subscriber station, it transmits a pulse along line EA and thus prepares the first input of AND-gate U1, which gate stands symbolically for a plurality of such gates. At the beginning of a time phase (which is the time interval during which the bits of an address - e.g. 8 bits - are stores in address counter ADZ), the start device ZPA signals its beginning and thus prepares the second input of AND-gate U1 as a result of which the contents of register HReg is transferred in parallel into the transmission register SR. If the contents of transmission register SR is different from O (this may be determined, for instance, by means of an OR-gate supplied with all bit outputs of transmission register SR) the left output of register SR is freed and its contents is transmitted rythmically serially by the intermediary of AND-gate U2 and line adapter LA to the signalling line or signal bus SignL. The transmission register is then filled with zeros in order to prevent transmission of additional information.

The following operations are performed at the subscriber station Tln2. Since all subscriber stations are designed in the same way, FIG. 2 may be relied upon to describe the operation of the transmitting subscriber station Tln1 as well as that of the receiving subscriber station Tln2. The subscriber station Tln2 is provided with a receiving register ER. Information derived from transmission register SR of station Tln1 is transmitted by way of line adapter LA to the receiving register ER. The left part of the receiving register ER contains the address transmitted from the subscriber station Tln1 and the right part of said register contains the state transmitted with the same message. The address evaluator ADE ascertains by comparison whether or not the address of the subscriber station Tln2 is included in the message which is received. If this is the case and the device ZPA determines, because of a state of synchronism, that the entire information is contained in the receiving register ER, AND-gate U3 is caused to have an output. As a result AND-gates U4 and U5 are placed in a state of preparedness.

Reference characters Dec have been applied to indicate a decoder. Decoder Dec decodes the information as to state in the receiving register ER which has been transmitted to it from the calling subscriber station. The decoder Dec has three outgoing lines. If the state "call" is recognized, a signal is transmitted to the highest of the three output lines of decoder Dec. If the state is "talk", or "numbers" the decoder Dec supplies an output signal to its intermediate output line, and if decoder Dec determines a state of waiting, it supplies an output signal to the lowest of its three output lines. It is apparent from the above that the presence of a call signal causes AND-gate U5, U6 and U7 to assume a state of preparedness. The second input of AND-gate U5 receives a signal from AND-gate U3 by virtue of the fact that both the address evaluator ADE and the device ZPA transmit simultaneously signals to the input terminals of AND-gate U3. The call signal forming the output of AND-gate U5 is supplied to the monostable device MK1 which, in turn, energizes a buzzer not shown in FIG. 2. The subscriber at station Tln2 can now go off hook.

FIG. 2 shows another monostable device MK2 intended to control another buzzer not shown in FIG. 2. That other buzzer is only energized in the case of a call which comes from an office transmission.

Since address evaluator ADA in the subscriber station Tln2 does not recognize the address of subscriber station Tln1, the AND-gate U1 has no output. However, the AND-gate U4 is placed in a state of preparedness since device ZPA has an output on its second output line. The holding register HReg transmits the second control signal to the transmission register SR from where it is transmitted - as determined by the central clock of the system - to signalling line SignL. As long as the called subscriber is not off hook, the aforementioned second control signal indicates a state of rest. The switching network KF is not activated at this time since one of the states required for its activation does not exist as yet. The subscriber station Tln2 is now being called. If the latter goes off hook, this information is recorded in the holding register HReg. The state of rest signal is transmitted by way of register SR to signalling line SignL. As soon as the switching network control KFSt (FIG. 1) twice recognizes the state of "talk," the switching network KF is activated by it. When subscriber station Tln2 goes again on hook, the information previously present in holding register HReg is replaced by information as to the state of rest. In that instance only zeros may be written into transmitting register SR.

As mentioned above, the AND-gate U6 is placed into a state of preparedness by way of the calling line. AND-gate U6 has an output when an output appears at a terminal of address evaluator ADA that corresponds to AND-gate U6. Thereupon AND-gate U12 is operated by the intermediary of OR-gate 01 and transmits the address to the decoder Decl at a point of time determined by device ZPA to be the end of the time phase. Decoder Decl controls a signal lamp L1 by the intermediary of AND-gate 02 and monostable device MK3. FIG. 2 shows by way of example several lamps L1....L2. Lamp L1 might be controlled by AND-gates U9 and U10 when the presence of "talk" or "waiting" signals is determined by decoder Dec. In the latter case one of the inputs of AND-gate 9 is supplied from generator SFG rapid blinking signals. The AND-gates U10 and U11 have an output only in case that address evaluator ADA and receiving register ER emit signals. AND-gate U11 must also be supplied from generator LFG with slow blinking signals.

If internal connections are established at all states, the corresponding lamps are continuously switched on, except for the lamp of the subscriber, which is the particular subscriber station or a station talking with it. In this instance the lamp assigned to the calling subscriber flickers slowly. When a line transmission calls, or is in a waiting state, the corresponding lamp flickers slowly and rapidly, respectively. Since control signals are of short duration, they are stored temporarily in monostable devices MK3 and MK4. These monostable devices are adjusted in such a way that they do not undergo a change for the duration of one frame. When a new control pulse is received within that time, they change their state and lamps L1,L2 are extinguished.

Figure 3:
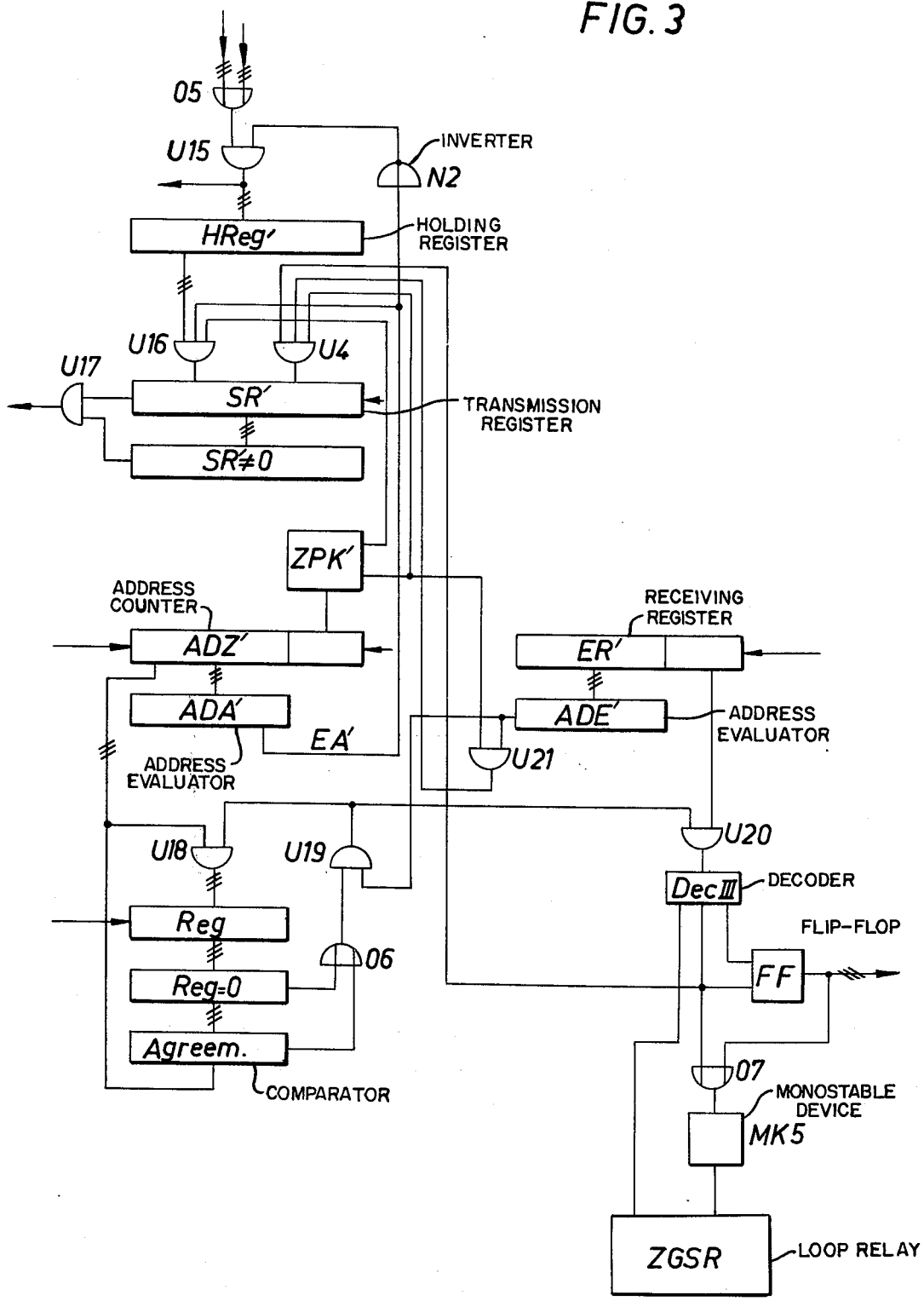
FIG. 3 is a diagram of the circuitry for controlling line transmissions.

FIG. 3 shows a line transmission in more detail, e.g. an office line transmission. The subscriber stations and the line transmissions have identical controls. In case that the line transmissions and the switching network are arranged in a common housing, the line transmissions do not require a particular power supply, clock counter and line adapter.

Dialling transmitters and loop relays are controlled inside of the line transmissions, the signals being derived from a call sensor or a dialling receiver.

The line transmissions may be condisered at one time as calling transmissions and at another time as called stations. They serve as called stations, e.g. in the case that a subscriber wishes to conduct an office call. When the subscriber goes off hook and depresses the office key, a word is formed by virtue of the pressure exerted upon the key which includes the address of the line transmission and information regarding the state of the call. Such a word looks as shown below:

| AUe | Gespr. | |
|---|---|---| wherein AUe stands for the address of the particular line transmission and "Gespr." is an indication for the state of the call. Assume that the line transmission is free, the information "state of the call" is released and thus a word is formed as follows which includes the address of the office transmission and two informations relative to the state of the call:

| AUe | Gespr. | Gespr. |
|---|---|---|

The line transmission shown in FIG. 3 will be considered initially as a calling transmission. If it is a calling transmission it may be either in the calling or waiting state. Hence a code must be transmitted to OR-gate 05 (which stnds for several such gates) from a calling relay or a waiting flipflop not shown in FIG. 3. This code is transmitted by way of AND-gate U15 to a holding register HReg., unless AND-gate U15 is blocked by logic inverter element N2. Such blocking is always effected when the transmission of the particular time phase occurs and a signal is transmitted from the address evaluater ADA' by way of line EA' to inverter N2. If the own time phase just begins, the AND-gate U16 is brought to a state of preparedness by means of line EA', and the action device ZPK' which determines the beginning of a time phase causes the appearance of an output at AND-gate U16. As a result, the contents of holding register HReg.' is transferred in parallel into the transmission register Sr'. If the contents of transmission registers SR' differs from zero, its content is transmitted serially by way of AND-gate 17.

Now the transmission of FIG. 3 will be considered as a called subscriber. At the initial state or state of rest the content of the register is zero, the OR-gate 06 has an output and the AND-gate 19 is in a state of preparedness. As soon as the address evaluator ADE' recognizes that the receiving register ER' contains the address of its own office transmission, this address is transferred into the register Reg due to the fact that each of both AND-gates U18 and U19 has two inputs and an output.

Reference characters Agreem have been applied to indicate a comparator which compares whether or not the contents of register Reg is the same as that of address counter ADZ'. When, at the occurrence of additional calls, the own address of the office transmission is recognized, AND-gate U19 is allowed to have an output only if the OR-gate 06 receives an input from comparator Agreem. If AND-gate U19 has an output, the additional AND-gate U20 has likewise an output. Hence the contents of the state portion of the receiving register ER' is transmitted to the decoder Dec III. Decoder Dec III has three outputs. The left output may consist of ten separate lines indicating FIGS. 1.....0. The center output indicates the signal "number or call" and the right output indicates "state of waiting." The last referred to two outputs of decoder Dec III are connected to flipflop FF. Flipflop FF transmits a waiting code and supplies one of the two inputs or OR-gate 07, whose second input is derived directly from decoder Dec III. The OR-gate 07 controls the monostable device MK5 which, in turn, supplies one of the inputs of number transmitter and loop relay ZGSR which is also directly connected to decoder Dec III.

Figure 4:
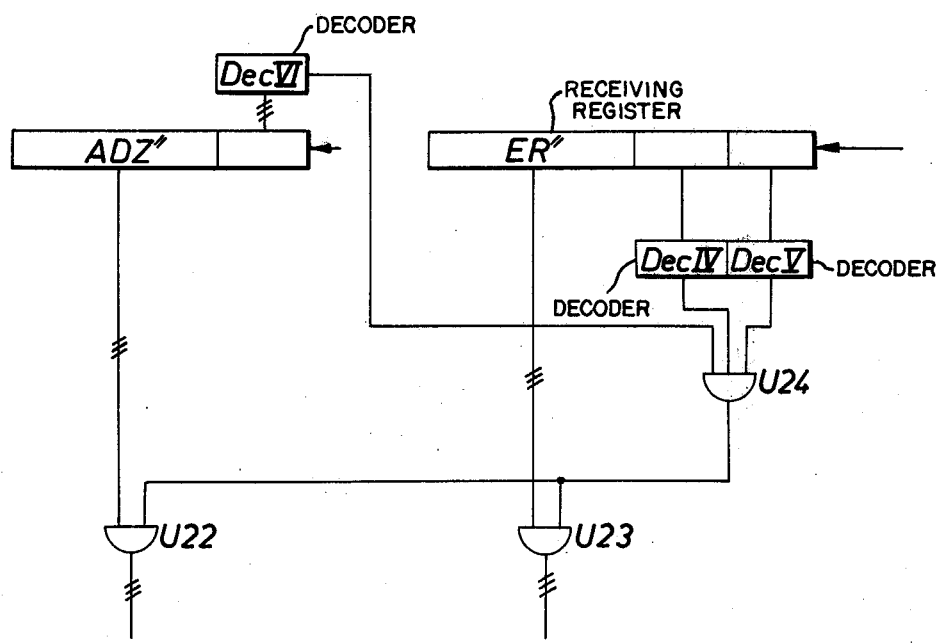
FIG. 4 is a diagram of the circuitry for controlling the switching network.

FIG. 4 shows in more detail the switching network control KFST also shown in FIG. 1. The two AND-gates U22 and U23 represent symbolically a larger number of such gates. The AND-gate U22 is a column control gate and the AND-gate 23 a line control gate for the switching network KF of FIG. 1. A control operation occurs any time when AND-gates U22 and U23 receive an input from the third AND-gate U24. In that instance the contents of address counter ADZ" and the contents of receiving register ER" respectively, are transmitted by way of gates U22 and U23. AND-gate U24 has three inputs of which one is connected to a decoder Dec IV and another is connected to a decoder Dec V. These decoders decode the contents of a second and of a third region, respectively, of the receiving register ER". The aforementioned second region contains information regarding the state of the calling subscriber station and the aforementioned third region contains information regarding the state of the called subscriber station. The third input of gate U24 is connected to a decoder Dec VI which emits a signal when a message is completely written into the receiving register ER". Thus the control of the lines and of the columns of the switching network KF occurs only if both states are written into the receiving register ER" and the time phase is at its end.

If the switching points of the switching network should not be monostable, a monostable circuitry must be included in the line control which remains in position for the duration of one frame. If the message does not reappear at the end of a frame, the voice channel is interrupted.

I claim as my invention:

1. A process for establishing connections between subscriber stations or line transmissions in a telephone system including the steps of a. storing in a register (H Reg) provided in each of a plurality of subscriber stations (T1n1, T1n2....T1nn) or line transmissions (AUe) of which each has a specific address the momentary status thereof and also the address of another of said plurality of subscriber stations or line transmissions intended to be called, said momentary status information and said address of another of said plurality of subscriber stations or line transmissions jointly forming specific signal words;

b. assigning a specific time slot to each of said plurality of subscriber stations or line transmissions, cyclically scanning said plurality of subscriber stations or line transmissions and transmitting from some of said plurality of subscriber stations or line transmissions said stored specific signal words thereof by way of a signal line (SignL) to all the other of said plurality of subscriber stations or line transmissions;

c. causing each of said plurality of subscriber stations or line transmissions whose address is included in one of said specific signal words received by it to add to said specific signal word an answer signal describing the own status thereof and to transmit said answer signal to said signal line; and d. supplying a complete data word formed by combining one of said specific signal words and said answer signal immediately following said one of said specific signal words by way of said signal line to a switching control unit (KFSt) and causing said switching control unit to control a switching network (KF) so as to connect one of said pluraliy of subscriber stations or line transmissions having transmitted one of said specific signal words to another of said plurality of subscriber stations or line transmissions who gave an answer signal to said one of said specific signal words.

2. A process as specified in claim 1, including the steps of
   a. transmitting one address and two status conditions jointly forming three pieces of information in said data word within three partial phases of predetermined length of a time phase; and
   b. cyclically repeating said time phase within a fixed time frame wherein said time phase is arranged at a predetermined point.

3. A telephone system in which subscriber stations are connected to other subscriber stations or to line transmissions through a switching network by means of a switching control unit including
   a. a single signalling line (SignL) common to all subscriber stations (Tln1,Tln2....Tlnn), all line transmissions (AUe) and to a switching control unit (KFSt) of the telephone system;
   b. address counter means (ADZ) arranged in each of said subscriber stations, each of said line transmissions and in said switching control unit;
   c. a centrally located clocking device (ZT) connected by said signalling line with said address counter means of each of said subscriber stations, said address counter means of each of said line transmissions and said address counter means of said switch control unit for synchronously advancing said address counter means thereof;
   d. means for cyclically assigning a specific time-slot to each of said subscriber stations and to each of said line transmissions;
   e. an address evaluator (ADA) and a storage register (HReg) arranged in each of said subscriber stations and in each of said line transmissions, said address evaluator being adapted to transmit a signal to said storage register in response to occurrence of the own address of the particualar subscriber station or line transmission at the output of said address counter forming part of the particular subscriber station or line transmission, and said storage register being adapted to transmit in response to said signal received from said address evaluator a specific word to said signalling line including information as to the momentary status of the calling subscriber station or line transmission and the address of a called subscriber station or line transmission;
   f. a receiving register (ER) connected to said signalling line arranged in each of said subscriber stations and in each of said line transmissions and connected to said address evaluator thereof, said address evaluator being adapted to transmit a signal to said storage register in response to reception of a specific signal word including the own address of the subscriber station or line transmission of which said address evaluator forms part, and said storage register being adapted to transmit to said signalling line in response to said signal from said address evaluator an answer describing the momentary status of said subscriber stations or line transmissions of which said address evaluator forms part; and
   g. a switching network for connecting and disconnecting a calling and a called subscriber station or line transmission under the control of said switching control unit, said switching control unit being adpated to control the connecting and disconnecting operations of said switching network on the basis of the information derived from said address counter means thereof, the reception of said specific signal words and the answer given to said specific signal words.

* * * * *